(No Model.) 2 Sheets—Sheet 1.

J. PHILLIPS.
GULLY CATCH PIT AND TRAP.

No. 522,351. Patented July 3, 1894.

Witnesses

Inventor
John Phillips
by Fetherstonhaugh & Co
Attys (No Model.) 2 Sheets—Sheet 2.

J. PHILLIPS.
GULLY CATCH PIT AND TRAP.

No. 522,351. Patented July 3, 1894.

Witnesses.

Inventor:
John Phillips
by Fetherstonhaugh & Co.
Attys.

United States Patent Office.

JOHN PHILLIPS, OF LONDON, ENGLAND, ASSIGNOR TO THE PATENT VICTORIA STONE COMPANY, LIMITED, OF SAME PLACE.

GULLY CATCH-PIT AND TRAP.

SPECIFICATION forming part of Letters Patent No. 522,351, dated July 3, 1894.

Application filed October 24, 1893. Serial No. 488,996. (No model.) Patented in England July 12, 1892, No. 12,763.

*To all whom it may concern:*

Be it known that I, JOHN PHILLIPS, a subject of the Queen of Great Britain, residing at Putney, London, England, have invented new and useful Improvements in Gully Catch-Pits and Traps, (for which I have received a patent in England, No. 12,763, dated July 12, 1892,) of which the following is a specification.
My invention relates to combined gully catch-pits and traps which were first invented by me and adopted by the London Metropolitan Commissioners of Sewers in 1848 and which are now in general use.
According to my invention I compactly arrange a street gully catch-pit and water trap by placing the trap so that the different chambers or compartments thereof lie against one side or end of the catch pit and by molding both the catch-pit and trap in one piece. By this construction the water-trap does not extend far under the roadway whereby it is less liable to be fractured by heavy traffic passing over or near it than is the case where the trap is placed endwise onto the catch pit. I also arrange a movable fender at a suitable position in the catch pit at some distance from the opening into the trap which fender prevents floating substances therein from reaching and choking the inlet or inlets to the trap, as is now the case without such preventive.

Figure 1:
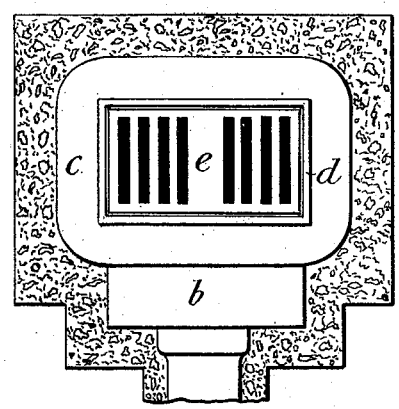
Figure 2:
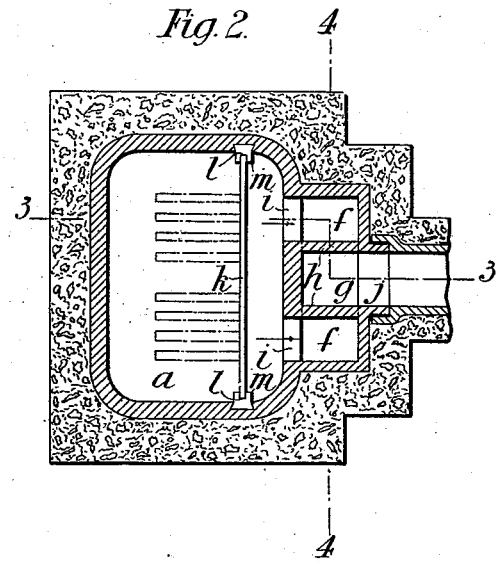
Figure 3:
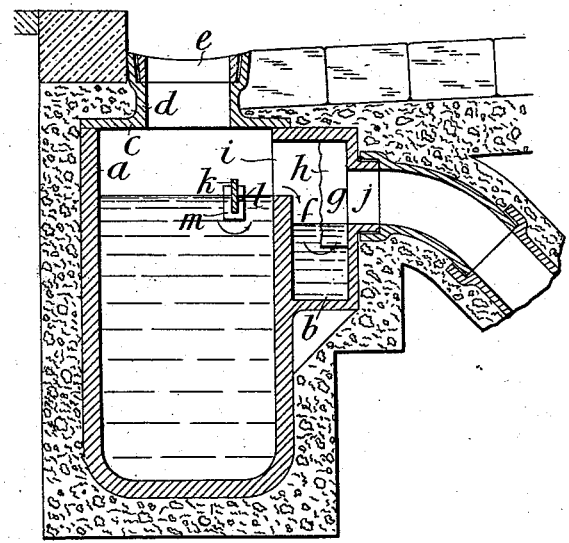
Figure 4:
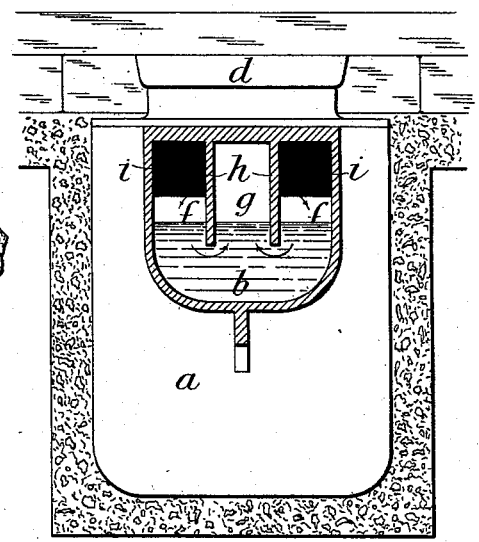
Figure 5:
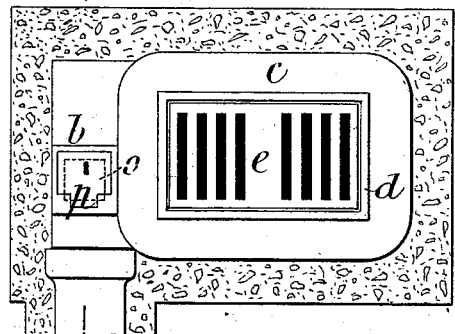
Figure 6:
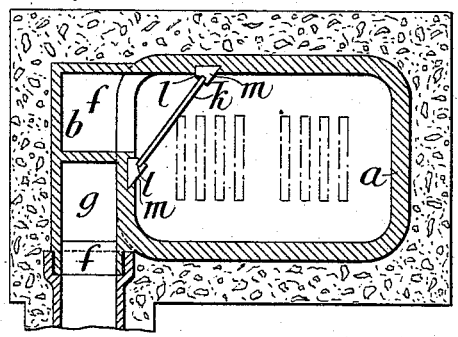

To enable my invention to be fully understood I will describe the same by reference to the accompanying drawings, in which—
Figure 1 is a plan view of a combined catch-pit and trap constructed according to my invention. Fig. 2 is a horizontal section of the same; and Figs. 3 and 4 are sections on the line 3—3 and 4—4 respectively of Fig. 2. Fig. 5 is a plan view of a modified form of catch-pit and trap. Fig. 6 is a horizontal section of the same; and Fig. 7 is a section on the line 7—7, Fig. 5.

Similar letters of reference indicate corresponding parts in the several figures.
*a* is the catch-pit, and *b* is the trap, which catch-pit and trap are formed or molded in one piece of fire-clay, stone-ware, iron, a composition of Portland cement and crushed and washed flint, quartz or granite siftings, or a composition known as "Victoria stone." The catch-pit may be oblong, square, elliptical, circular or of any other suitable shape in horizontal section, with a flat or curved bottom and vertical or inclined sides, and with all the internal angles and corners curved so that no deposit may accumulate therein. In practice, however, I prefer to make it oblong in horizontal section as I find that when made of this shape it can be emptied more expeditiously with a scoop than if made of any other shape. The top of the catch-pit may be made flat in order that a cast iron cover *c* and frame *d* with a grating *e* therein may be placed upon the same as shown in Figs. 1, 3 and 5, or it may be formed with a socket to receive a cast-iron frame and grating. The trap which is formed upon one side or end of the catch-pit is closed at the top and bottom and is provided with one or two water seals.

As shown in Figs. 3 and 4 the trap is represented as placed on the side of the catch-pit and divided into three chambers or compartments *f, f, g* by the partitions *h, h*, the said chambers or compartments all having one side formed by the wall of the catch-pit. The chambers *f, f* communicate with the catch-pit through the openings *i, i* and the chamber *g* communicates with the discharge outlet *j* (formed with a spigot pipe fitting into the socket of a pipe), the partitions *h, h* extending a sufficient distance below the level of the outlet *j* to provide two water seals, when the trap is filled with water, to prevent sewage gas from passing the same and entering the chambers *f, f* and thence passing into the catch-pit. The bottom of the trap is preferably curved as shown in Fig. 4 so as to prevent any deposit accumulating in the corners thereof.

Figure 7:
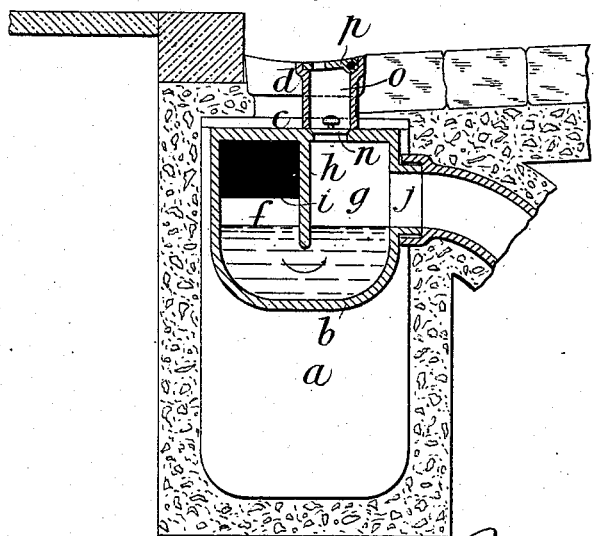

The trap which is represented in Figs. 5 to 7 is formed upon one end of the catch-pit and provided with only a single partition *h* forming two chambers *f, g* in which case there is only a single water seal. In this modification it will be noticed that both chambers of the trap have one side formed by the wall of the catch-pit.

The special advantage of the arrangement last described is that the trap by being placed against the end of the catch-pit projects less into the road-way than a trap formed against the side as shown in Figs. 1 to 4.

It will be noticed that the bottom of the discharge opening $j$ in both of the arrangements hereinbefore described is below the level of the openings $i, i$ through which the water passes into the trap, in order that the water level in the trap shall be below that in the catch-pit so that as the water flows and falls as a cascade from the catch-pit into the trap it will cause a commotion in the latter whereby sedimentary matter contained in the water is prevented from depositing and accumulating in the trap, thus rendering the latter self-cleaning.

In order to, as far as possible, prevent straw, sticks or other floating substances or refuse falling into the catch-pit from collecting across the openings $i, i$ or passing into the trap I provide as hereinbefore stated a movable fender or guard $k$ arranged at a short distance from the said openings $i$, and of such a width that it will extend a few inches above and a few inches below the bottoms of the said openings. As shown the movable fender or guard $k$ is arranged at some distance from the openings $i, i$ but in such a position that no solid matter falling through the grating of the gully can drop behind it. It is represented as being carried in grooves $l, l$ formed in blocks $m, m$ fixed in the sides of the catch-pits but the said grooves may be formed on the side of the catch-pit or the fender may be arranged in any other suitable manner.

In emptying the catch-pit the workman after the grating $e$ is lifted introduces his hand and removes the fender or guard, thereby enabling him to discharge the water from the catch-pit into the trap by means of a suitable scoop.

In some cases I find it advantageous to provide the trap with a removable cover so that in case of necessity the hand may be introduced into the trap or a clearing rod into the pipe leading from the trap to the sewer. Such an arrangement is represented in Fig. 7 where $n$ indicates the cover, a well $o$ being formed above the trap closed by a hinged cover $p$ level with the surface of the paved gutter or roadway.

Having now particularly described and ascertained the nature of my said invention and in what manner the same is to be performed, I declare that what I claim is—

A combined gully-catch pit and trap molded in one piece and comprising the catch pit $a$, the trap $b$ offset therefrom, having two openings $i$ leading thereto and an outlet located upon the opposite side centrally of the inlet openings, and walls $h$ connecting the inner edges of the inlet openings with the side edges of the outlet opening, said walls depending below the bottom of the outlet, substantially as described.

JOHN PHILLIPS.

Witnesses:
G. F. REDFERN,
JOHN E. BOUSFIELD,
*Of the firm of G. F. Redfern & Co., 4 South Street, Finsbury, London, Patent Agents.*